Oct. 13, 1964    J. R. JOHNSON    3,152,901
CREDIT CARD OR THE LIKE
Filed March 7, 1962    2 Sheets-Sheet 1
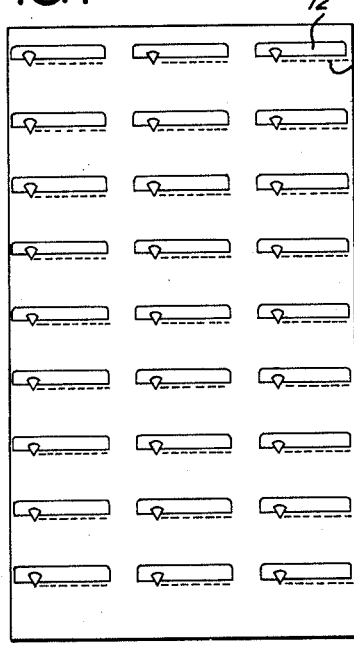
FIG. 1
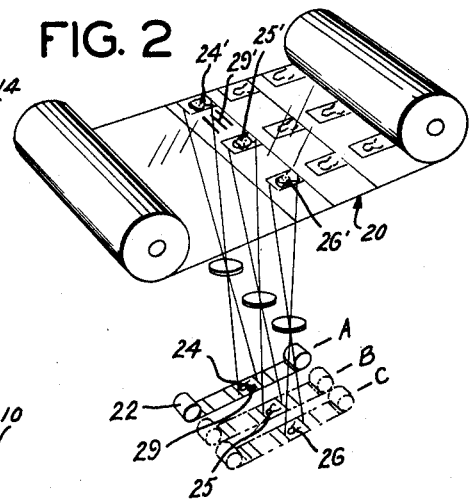
FIG. 2
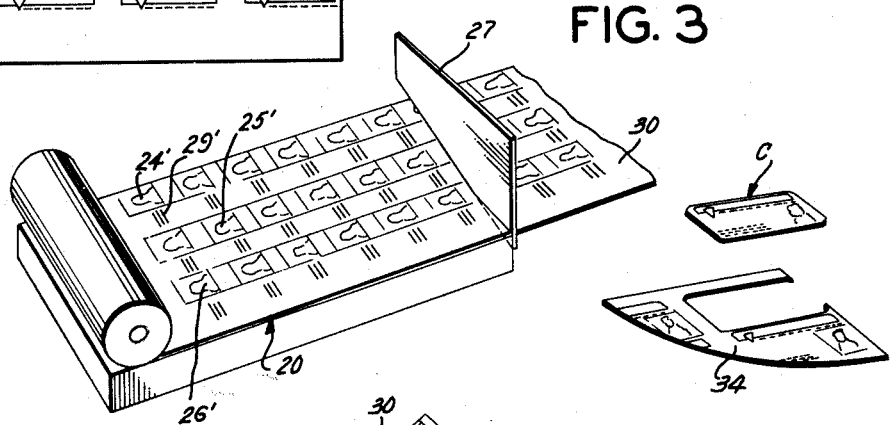
FIG. 3
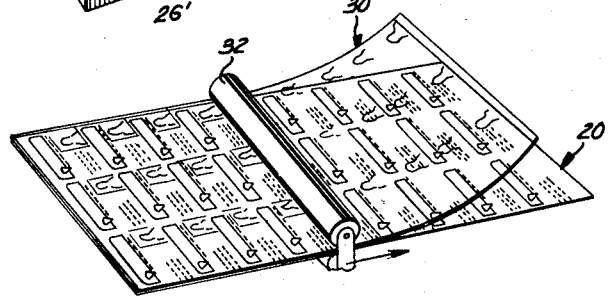
FIG. 4
FIG. 5
INVENTOR.
JAMES R. JOHNSON
BY FULWIDER MATTINGLY
& HUNTLEY
ATTORNEYS Oct. 13, 1964  J. R. JOHNSON  3,152,901
CREDIT CARD OR THE LIKE Filed March 7, 1962  2 Sheets-Sheet 2

INVENTOR.
JAMES R. JOHNSON
BY FULWIDER MATTINGLY
& HUNTLEY

ATTORNEYS

3,152,901
CREDIT CARD OR THE LIKE
James R. Johnson, Tujunga, Calif., assignor, by direct and mesne assignments, to Security Cards Research Incorporated, a corporation of California
Filed Mar. 7, 1962, Ser. No. 178,018
3 Claims. (Cl. 96—43)

The present invention relates to a novel and improved card that serves to positively identify its holder.

There have been heretofore proposed cards designed to identify their holders to others. A typical example is the so-called "credit card" provided by various commercial enterprises, such as restaurants, service stations, department stores, hotels and the like. Such credit cards are generally embossed with the holder's name, address and a code number permitting charges to be made to the account of the card's holder. These embossed cards may be placed in a small imprinter whereby the embossed indicia are applied to a receipt form or the like. Copies of such receipt form are usually sent to the accounting department of the organization giving credit, the commercial enterprise rendering the service or goods for which the card holder is to be billed and to the card holder. Such embossed cards are generally termed "self-writing" since they eliminate the time that would be required to manually imprint the necessary indicia on the receipt form.

Although such credit cards permit a billing operation to be conducted in a minimum period of time, they are subject to loss or theft with possible subsequent use by unauthorized persons. It is a major object of the present invention to provide a credit card that is not usable by unauthorized persons.

It is another object of the present invention to provide a credit card or the like bearing a photographic likeness of its holder.

Another object of the present invention is to provide a credit card or the like of the aforedescribed nature which will be automatically defaced should an unauthorized holder attempt to change the photographic likeness.

A further object of the present invention is to provide a credit card or the like of the aforedescribed nature which is particularly durable and will provide a long and useful service life.

Yet an additional object of the present invention is to provide a novel method for making a credit card or the like of the aforedescribed nature by means of which said card may be economically produced in large numbers.

These and other objects and advantages of the present invention will become apparent from the following detailed description, when taken in conjunction with the appended drawings wherein:

FIGURE 1 is a top plan view showing a sheet of synthetic plastic from which are formed a plurality of base members of a preferred form of credit card or the like in accordance with the present invention;

FIGURES 2 through 5 are perspective views showing various steps followed in making a preferred form of credit card or the like in accordance with the present invention;

Figure 6:
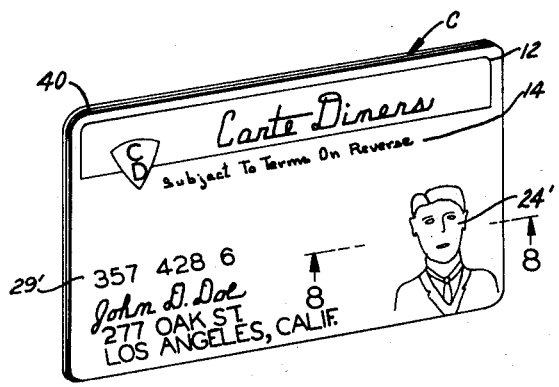
FIGURE 6 is a perspective view of a completed credit card or the like made in accordance with the present invention.

Referring to the drawings, the preferred form of credit card or the like embodying the present invention is most desirably manufactured by a mass production type of operation. Thus, in FIGURE 1 there is shown a sheet of a suitable synthetic plastic 10 such as polyvinyl chloride. Generally, such plastic sheets 10 are commercially available in a standard width of twelve inches and length of twenty inches. The sheet 10 will be utilized to form the base members of a plurality of credit cards or the like of the present invention. To this end there are printed on the face of the sheet 10 a plurality of rows of designs or emblems 12. Additional indicia 14 may also be printed on the face of sheet 10 adjacent each design 12. The designs 12 and indicia 14 will be identical on each card and will provide necessary general information which is common to each individual credit card. In a typical application the designs or emblems 12 may take the form of the trademark or service mark of the firm issuing the credit cards, while the additional indicia may set forth instructions or the like regarding use of the cards. Although not shown in the drawings, the reverse of the plastic sheet 10 may bear additional printing to appear on the reverse of each of the credit cards.

The plastic sheet 10 of FIGURE 1 is utilized in conjunction with a roll of photographic film 20 shown in FIGURES 2 through 4 to form a plurality of credit cards or the like embodying the present invention. With reference first to FIGURE 2, the film 20 is backless and therefore initially transparent. Disposed or placed below the initially unexposed film 20 there is a roll of developed film 22 bearing the photographic likenesses of persons to whom the completed cards will be issued. The photographic likenesses on the roll of developed film 22 are projected onto the initially unexposed film 20 while the developed film 22 is reversed, i.e., instead of an emulsion-to-emulsion relationship the projection would take place with the emulsion of developed film 22 remote from the emulsion of unexposed film 20 for reasons to be set forth hereinafter.

The projection of the photographic likenesses 24 may be made in a manner well known to those skilled in the photographic art. Preferably, the developed film 22 is advanced in a step and repeat motion across the width of the unexposed film 20. Thus, with continued reference to FIGURE 2, the developed film 22 is first arranged in position A and photographic likeness 24 is projected onto the unexposed film 20 as indicated at 24'. Next, the developed film 22 is moved in a direction across the width of the film 20 to its dotted outline position indicated at B. Additionally, the film 22 will have been advanced longitudinally so as to dispose the next photographic likeness 25 in position for projection. The photographic likeness 25 is then projected onto the film 20 as indicated at 25'. Next, the developed film 22 is moved to its dotted outline position C and advanced longitudinally so as to arrange the next photographic likeness 26 in position for projection. The photographic likeness 26 is then projected onto the film 20 as indicated at 26'. The film 20 will then be advanced longitudinally so as to dispose it in position to receive the next roll of photographic likenesses. The film 22 may be returned to its position A. If desired, the film 20 may be provided with an indexing mark that cooperates with a photoelectrically actuated cutter so as to automatically cut off the film 20 into lengths corresponding to the length of the plastic sheet 10.

In addition to the photographic likenesses 24, 25 and 26 the developed film may bear indicia 29 specifically pertaining to the individual card holder identified by the photographic likenesses. Such indicia generally include information such as the card holder's name and address.

The indicia 29 will be projected onto the developed film 20 concurrently with the photographic likenesses so as to be reproduced as indicia 29' on film 20.

The roll of film 20 will then be developed in a conventional manner. Thereafter, as indicated in FIGURE 3, the roll of film 20 will be cut as by a blade 27 into individual lengths 30 corresponding to the length of the synthetic plastic sheet 10 shown in FIGURE 1. The width of the roll of film 20 will generally correspond to the width of the plastic sheet 10.

Referring now to FIGURE 4, the emulsion side of the cut-off length of film 30 is next adhered to the face of the plastic sheet 10. As noted hereinabove, the photographic likenesses are projected from the film with the latter reversed. In this manner these likenesses will appear in their normal order on the emulsion of the cut-off length of film 30 when looking through the base thereof. A suitable adhesive (not shown in FIGURE 4) is employed to adhere the film length 30 to the plastic sheet 10, with such adhesive preferably having a bonding strength that is greater than the attraction of the emulsion of the film to the transparent body of the film. Such an adhesive is sold under the trademark Eastman 910 Cement distributed by Armstrong Cork Company of Lancaster, Pennsylvania. Conveniently, the adhesive will be suitably deposited on the face of the sheet 10 whereafter the cut-off film length 30 is pressed thereagainst as by means of a double roller assembly 32.

After the cut-off length of film 32 has been adhered to the plastic sheet 10, the individual credit cards C will be punched out or otherwise cut out of the assembly 34 consisting of the plastic sheet 10 and film length 32, as indicated in FIGURE 5. This may be accomplished in a conventional manner.

Figure 8:
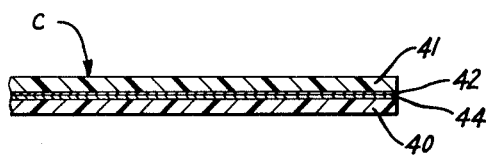
FIGURE 8 is a horizontal sectional view in enlarged scale taken on line 8—8 of FIGURE 6.

Referring now to FIGURES 6 and 8, each completed credit card C comprises a base member 40 formed of synthetic plastic, a cover member formed of photographic film from the roll of film 20 and including a film backing 41 and a light-sensitive emulsion 42, and finally a layer of adhesive 44. It will be noted that the emulsion 42 bears the photographic likenesses 24' as well as the other indicia 29' which are particular to each individual credit card.

Figure 7:
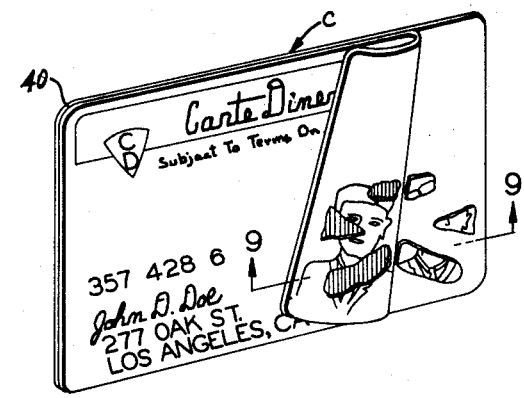
FIGURE 7 is a perspective view showing the manner in which the credit card of FIGURE 6 is automatically defaced if an unauthorized person attempts to alter such card.
Figure 9:
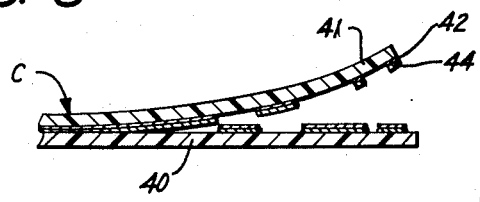
FIGURE 9 is a similar view taken on line 9—9 of FIGURE 7.

Referring now to FIGURES 7 and 9, it has been previously set forth that the bonding strength of the adhesive 44 is preferably greater than the adherence of the emulsion 42 to the backing 41 of the cover member. Accordingly, should the cover member be peeled away from the face of the base member 40, the adherence of the emulsion 42 to the adhesive 44 will cause fragments of the emulsion to be pulled away from the face of the base member. Thus, it will not be possible for an unauthorized holder of the card C to substitute another photographic likeness for that originally formed on the credit card C without defacing the card.

It may be desirable to provide the completed credit card C with self-writing embossing. Generally, such embossing will set forth a code number permitting charges to be made to the card holder's account. Where the credit card C is to be embossed the thickness of such card should preferably be in the order of one thirty second of an inch. In some instances it may be desirable to include means on the credit card C for receiving the card holder's signature. This may be accomplished by providing an appropriate non-erasable strip of paper that is adhered to either side of the completed credit card.

From the foregoing description it will be observed that the present invention provides a method for producing credit cards or the like in large numbers at low cost.

The credit cards or the like produced in accordance with the present invention will have an attractive appearance, particularly where the indicia appearing on the plastic sheet 10 are printed in color. Generally, in the interest of economy the photographic likeness of the credit card holder as well as the other indicia appearing on the photographic film 20 will be in black and white.

Various modifications and changes may be made with respect to the foregoing detailed description without departing from the spirit of the present invention or the scope of the following claims.

I claim:

1. A method for making a tamper-proof identification card for use by a holder belonging to a common group, comprising:
   producing first indicia common to said group on one side of a non-transparent base member;
   photographing second indicia specifically pertaining to said holder onto the emulsion bearing side of a transparent photographic film;
   and
   adhering the emulsion bearing side of said film onto said one side of said base member with sufficient bonding strength that said photographically-produced second indicia are defaced when said film is peeled from said base member but with said film normally protecting said indicia.

2. A method for making a tamper-proof identification card for use by a holder belonging to a common group, comprising:
   producing first indicia common to said group on one side of a non-transparent base member;
   photographing second indicia specifically pertaining to said holder and a portrait of said holder onto the emulsion bearing side of transparent photographic film;
   and
   adhering the emulsion bearing side of said film onto said one side of said base member with sufficient bonding strength that said photographically-produced second indicia are defaced when said film is peeled from said base member but with said film normally protecting said indicia.

3. A method of making an identification card for use by a holder belonging to a common group, comprising:
   producing first indicia common to said group on one side of a non-transparent base member of embossable material;
   photographing second indicia specifically pertaining to said holder onto the emulsion bearing side of transparent photographic film;
   adhering said emulsion bearing side of said film to said one side of said base member with sufficient bonding strength that said photographically produced indicia are defaced when said film is peeled from said one side of said base member whereby said card cannot be used by unauthorized persons;
   and
   embossing said base member and said film with additional indicia specifically pertaining to said holder.

References Cited in the file of this patent

UNITED STATES PATENTS

| | | |
|---|---|---|
| 2,395,804 | De Gruchy | Mar. 5, 1946 |
| 2,533,474 | Koch | Dec. 12, 1950 |
| 2,604,710 | Beaune | July 29, 1952 |
| 2,712,514 | English | July 5, 1955 |
| 3,015,267 | Dashew | Jan. 2, 1962 |